(12) United States Patent
Zhang et al.

(10) Patent No.: US 6,904,501 B1
(45) Date of Patent: Jun. 7, 2005

(54) CACHE MEMORY FOR IDENTIFYING LOCKED AND LEAST RECENTLY USED STORAGE LOCATIONS

(75) Inventors: David X. Zhang, San Jose, CA (US); Kenneth C. Yeager, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 218 days.

(21) Appl. No.: 10/174,391

(22) Filed: Jun. 17, 2002

(51) Int. Cl.$^7$ .............................................. G06F 12/00
(52) U.S. Cl. ...................... 711/134; 711/136; 711/145; 711/152; 711/156; 711/159
(58) Field of Search ................................ 711/134, 136, 711/145, 156, 159, 152

(56) References Cited

U.S. PATENT DOCUMENTS

| | | | | |
|---|---|---|---|---|
| 5,353,425 A | * | 10/1994 | Malamy et al. ............. | 711/144 |
| 5,493,667 A | * | 2/1996 | Huck et al. .................. | 711/125 |
| 5,974,508 A | * | 10/1999 | Maheshwari ................ | 711/133 |
| 6,134,636 A | * | 10/2000 | Mathews et al. ............ | 711/163 |
| 6,584,547 B2 | * | 6/2003 | Palanca et al. .............. | 711/133 |
| 6,643,737 B1 | * | 11/2003 | Ono ............................ | 711/128 |
| 2003/0070047 A1 | * | 4/2003 | Dwyer et al. ................ | 711/136 |
| 2003/0204677 A1 | * | 10/2003 | Bergsten ...................... | 711/144 |

OTHER PUBLICATIONS

"Pre-Fetching with the Segmented LRU Algorithm," Pendse et al, Circuits and Systems, 1999. 42nd Midwest Symposium on, vol. 2, Aug. 11, 1999. pp. 862–865.*

"LRU–SP: a size–adjusted and popularity–aware LRU replacement algorithm for web caching," Leff et al. Computer Software a Applications Conference, 2000. COMPSAC 2000. The Annual International, Oct. 25–27, 2000. pp. 48–53.*

* cited by examiner

Primary Examiner—Christian P. Chace
(74) Attorney, Agent, or Firm—Baker Botts L.L.P.

(57) ABSTRACT

A cache memory includes a plurality of data memory blocks and a code memory block. Each data memory block has a plurality of storage locations and has a particular storage location identified by a same index value. The code memory block has a plurality of code values with a particular code value being associated with the same index value. The particular code value is operable to identify which ones of the particular storage locations associated with the same index value are locked to prevent alteration of contents therein. The particular code value is also operable to identify which particular storage location has been most recently used and which particular storage location has been least recently used of the particular storage locations associated with the same index value.

17 Claims, 5 Drawing Sheets

FIG. 2

| CONDITION | LOCK | LRU ORDERING |
|---|---|---|
| If $dc \neq ba$ | No Lock | $dc$=MRU Way, $ba$=LRU Way.<br>If $e=0$ then MRU-1 is on left of LRU-1 in $\{ba, \bar{b}a, b\bar{a}, \bar{b}\bar{a}\}$.<br>If $e=1$ then MRU-1 is on right of LRU-1 in $\{ba, \bar{b}a, b\bar{a}, \bar{b}\bar{a}\}$. |
| If $dc=ba \neq 00$ | Way 0 Locked | 00=MRU Way, $ba$=LRU Way.<br>If $e=0$ then MRU-1 is on left of LRU-1 in $\{ba, \bar{b}a, b\bar{a}, \bar{b}\bar{a}\}$.<br>If $e=1$ then MRU-1 is on right of LRU-1 in $\{ba, \bar{b}a, b\bar{a}, \bar{b}\bar{a}\}$. |
| If $dc=ba=00$ | Both Way 0 and 1 Locked | 00=MRU Way, 01=MRU-1 Way.<br>If $e=0$ then 11=LRU Way, 10=LRU-1 Way.<br>If $e=1$ then 10=LRU Way, 11=LRU-1 Way. |

FIG. 3

| LRU CODE[4:0] | | | GRAY CODE | | | | UNCOMPRESS LRU CODE | | | | LOCK |
|---|---|---|---|---|---|---|---|---|---|---|---|
| e | dc | ba | $ba$ | $\bar{b}a$ | $b\bar{a}$ | $\bar{b}\bar{a}$ | MRU | MRU-1 | LRU-1 | LRU | |
| 0 | 11 | 00 | 00 | 10 | 11 | 01 | 11 | 10 | 01 | 00 | NO LOCK |
| 1 | 11 | 00 | 00 | 10 | 11 | 01 | 11 | 01 | 10 | 00 | NO LOCK |
| 0 | 01 | 01 | 01 | 11 | 10 | 00 | 00 | 11 | 10 | 01 | WAY 0 LOCKED |
| 1 | 01 | 01 | 01 | 11 | 10 | 00 | 00 | 10 | 11 | 01 | WAY 0 LOCKED |
| 0 | 00 | 00 | 00 | 10 | 11 | 01 | 00 | 01 | 10 | 11 | BOTH WAYS LOCKED |
| 1 | 00 | 00 | 00 | 10 | 11 | 01 | 00 | 01 | 11 | 10 | BOTH WAYS LOCKED |

CACHE MEMORY FOR IDENTIFYING LOCKED AND LEAST RECENTLY USED STORAGE LOCATIONS

TECHNICAL FIELD OF THE INVENTION

The present invention relates in general to memory processing techniques and more particularly to a cache memory for identifying locked and least recently used storage locations.

BACKGROUND OF THE INVENTION

A cache memory typically stores data that is more frequently used for fast access in order to avoid the delay of retrieving data from a main memory. The data is stored in the cache memory in one or more storage locations known as lines. Each line includes the data and tag information identifying what data is stored in the line. The tag information includes an address field and various control fields and bits. The number of fields and bits for control is relatively small and may limit the amount of control information that may be carried therein. Real time performance of a cache can be improved by setting a lock bit associated with a cache line so that the cache line data cannot be evicted from the cache for being least recently used. Since every data entry needs a lock bit, the cost of a lock bit can be significant with large cache sizes.

SUMMARY OF THE INVENTION

From the foregoing, it may be appreciated by those skilled in the art that a need has arisen to combine control functions and information in a fewer number of bits of the tag information in a cache line of a cache memory. In accordance with the present invention, a cache memory for identifying locked and least recently used storage locations is provided that substantially eliminates or greatly reduces disadvantages and problems associated with conventional cache memory designs.

According to an embodiment of the present invention, there is provided a cache memory for identifying locked and least recently used storage locations that includes a plurality of data memory blocks with each data memory block having a plurality of storage locations. Each data memory block has a particular storage location identified by a same index value. A code memory block has a plurality of code values A particular code value is associated with the index value. The particular code value identifies which ones of the particular storage locations associated with the index value are locked to prevent alteration of contents therein. The particular code value also identifies which particular storage location has been most recently used and which particular storage location has been least recently used of the particular storage locations associated with the index value.

The present invention provides various technical advantages over conventional cache memory designs. For example, one technical advantage is the combination of locked and least recently used indications in a common code value. Another technical advantage is the reduction of a number of bits of tag information in a cache line of a cache memory and thus provide significant memory savings. Yet another technical advantage is to eliminate recordation of usage information for a locked cache line. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2 illustrates how a code value in the cache memory is decoded to determine what locations are locked and least recently used;

FIG. 3 illustrates a sample decoding of the code value;

DETAILED DESCRIPTION OF THE INVENTION

Figure 1:
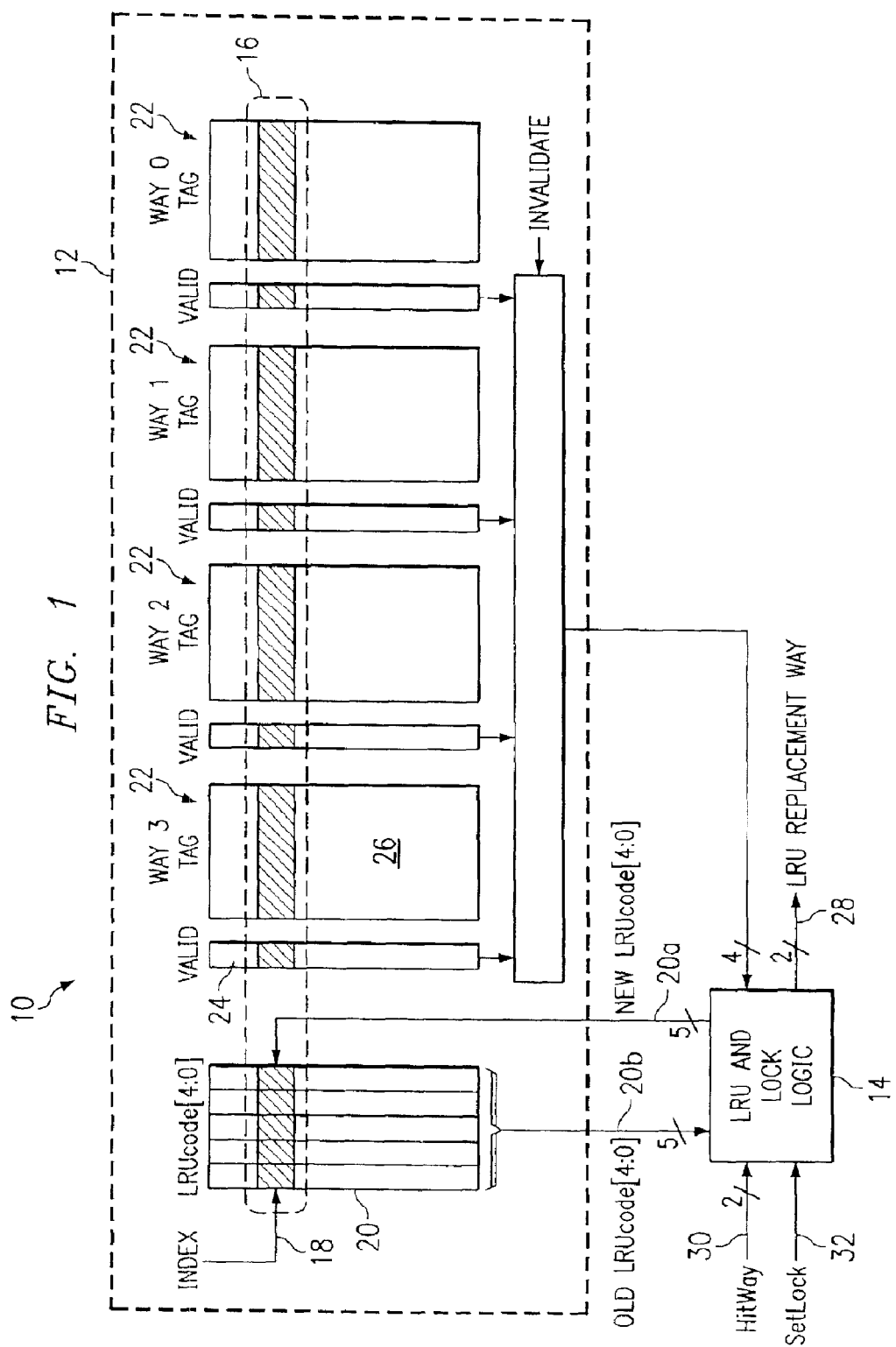
FIG. 1 illustrates a block diagram of a cache memory.

FIG. 1 is a block diagram of a cache memory 10. For purposes of illustration, cache memory 10 will be discussed as a four way set associative though the present invention may be applicable to any number of ways for a set associative cache. Cache memory 10 includes a memory unit 12 and a logic block 14. Memory unit 12 is divided into a number of storage locations or sets 16 with each set accessed by an index 18. Each set has a priority lock code 20 in a code memory block and four data memory blocks or ways 22 associated therewith. Priority lock code 20 determines which way 22 associated with index 18 has been most recently used (MRU), least recently used (LRU), next most recently used (MRU-1), and next least recently used (LRU-1). Priority lock code 20 also determines which way 22 is in a locked state. When a way 22 is locked, its set information cannot be replaced until the set information is invalidated. Each way 22 includes a valid bit 24 and tag information 26 for each set 16. Valid bit 24 determines whether set information associated therewith is valid. Tag information 26 identifies what set information is stored and associated therewith.

When a cache miss occurs, a decision must be made as to which cache way is to be replaced. Priority lock code 20 records the time ordering of the cache ways based on previous memory references. The LRU way identified by priority lock code 20 is used to determine the cache way to be replaced. Logic block 14 updates priority lock code 20 for each set 16. Logic block 20 determines a new priority lock code 20 and identifies a new LRU way 28 for which new set information may be stored as needed. Logic block 14 determines the new priority lock code 20a and new LRU way 28 in response to a Hitway indicator 30, a Setlock indicator 32, and the old priority lock code 20b. Hitway indicator 30 is used to determine which way received the latest hit. Setlock indicator 32 determines which way is to be locked.

FIG. 2 shows how priority lock code 20 is decoded. Priority lock code 20, in the illustrated example, is a five bit compressed code. To uncompress the code, four unique gray code numbers are generated from bits 0 and 1 of priority lock code 20. Bits 2, 3, and 4 of priority lock code 20 are used to identify the ordering of each way 22. Symbols e, d, c, b, and a are used to represent each bit of priority lock code 20 where e=bit 4, d=bit 3, c=bit 2, b=bit 1, and a=bit 0. The four unique gray code numbers are b a, b $\bar{a}$, $\bar{b}$ a, $\bar{b}$ $\bar{a}$. One of the four gray code numbers identifies MRU way 22 and another gray code number identifies LRU way 22. A third gray code number identifies MRU-1 way 22 and the remaining gray code number identifies LRU-1 way 22.

From the table of FIG. 2, if no cache way 22 is locked, indicated by dc≠ba, MRU way 22 is identified by dc and its equivalent gray code number in b a, b $\bar{a}$, $\bar{b}$ a, $\bar{b}$ $\bar{a}$. LRU way 22 is identified by b a. MRU-1 way 22 is on the left of LRU-1 way 22 in b a, b ā, b̄ a, b̄ ā after MRU way 22 and LRU way 22 are determined when e=0. When e=1, MRU-1 way 22 is on the right of LRU-1 way 22 in b a, b ā, b̄ a, b̄ ā after MRU way 22 and LRU way 22 are determined. If cache way 0 is locked, indicated by dc=b a≠00, MRU way 22 is identified by 00 and LRU way 22 is identified by b a in b ā, b̄ a, b̄ ā, b a. MRU-1 way 22 is on the left of LRU-1 way 22 in b a, b ā, b̄ a, b̄ ā after MRU way 22 and LRU way 22 are determined when e=0. When e=1, MRU-1 way 22 is on the right of LRU-1 way 22 in b a, b ā, b̄ a, b̄ ā after MRU way 22 and LRU way 22 are determined. If both cache way 0 and 1 are locked, indicated by dc=b a=00, MRU way 22 is identified by 00 and MRU-1 way 22 is identified by 01 in b a, b ā, b̄ a, b̄ ā. LRU way 22 is identified by 11 and LRU-1 way 22 is identified by 10 in b a, b ā, b̄ a, b̄ ā when e=0. When e=1, LRU way 22 is identified by 10 and LRU-1 way 22 is identified by 11 in b a, b ā, b̄ a, b̄ ā.

FIG. 3 shows some sample decodings for priority lock code 20. From priority lock code 20, gray code numbers b a, b ā, b̄ a, b̄ ā are determined. Cache way locks are determined by a comparison of dc and b a. MRU way 22, MRU-1 way 22, LRU-1 way 22, and LRU way 22 are then identified based on the lock state of cache memory 10 and the value of bit e. In this manner, priority lock code 20 can provided a combined decoding of cache way locks and LRU ways.

Figure 4A:
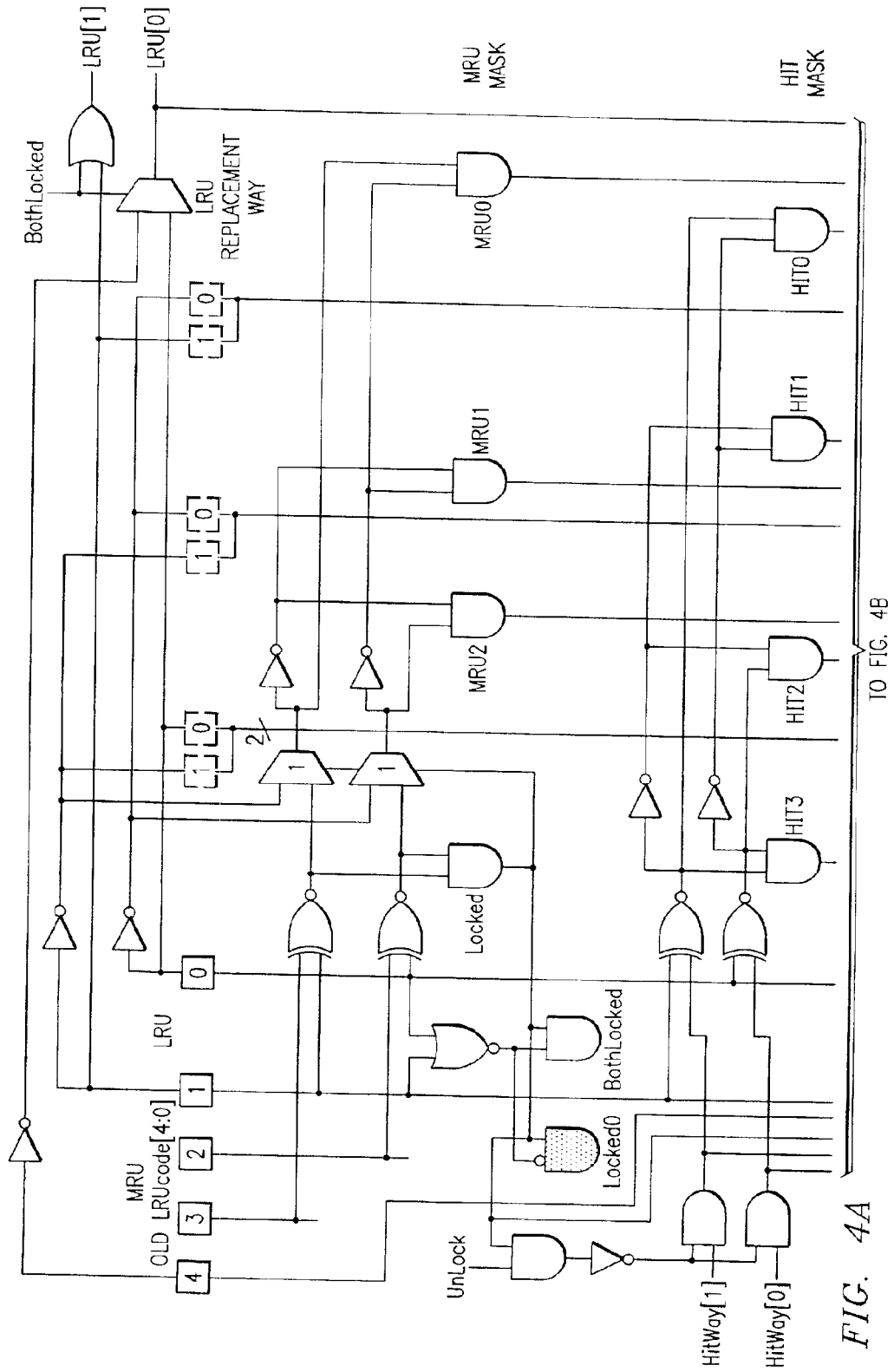
FIGS. 4A–C illustrate block diagrams of a logic circuit in the cache memory for determining the code value.
Figure 4B:
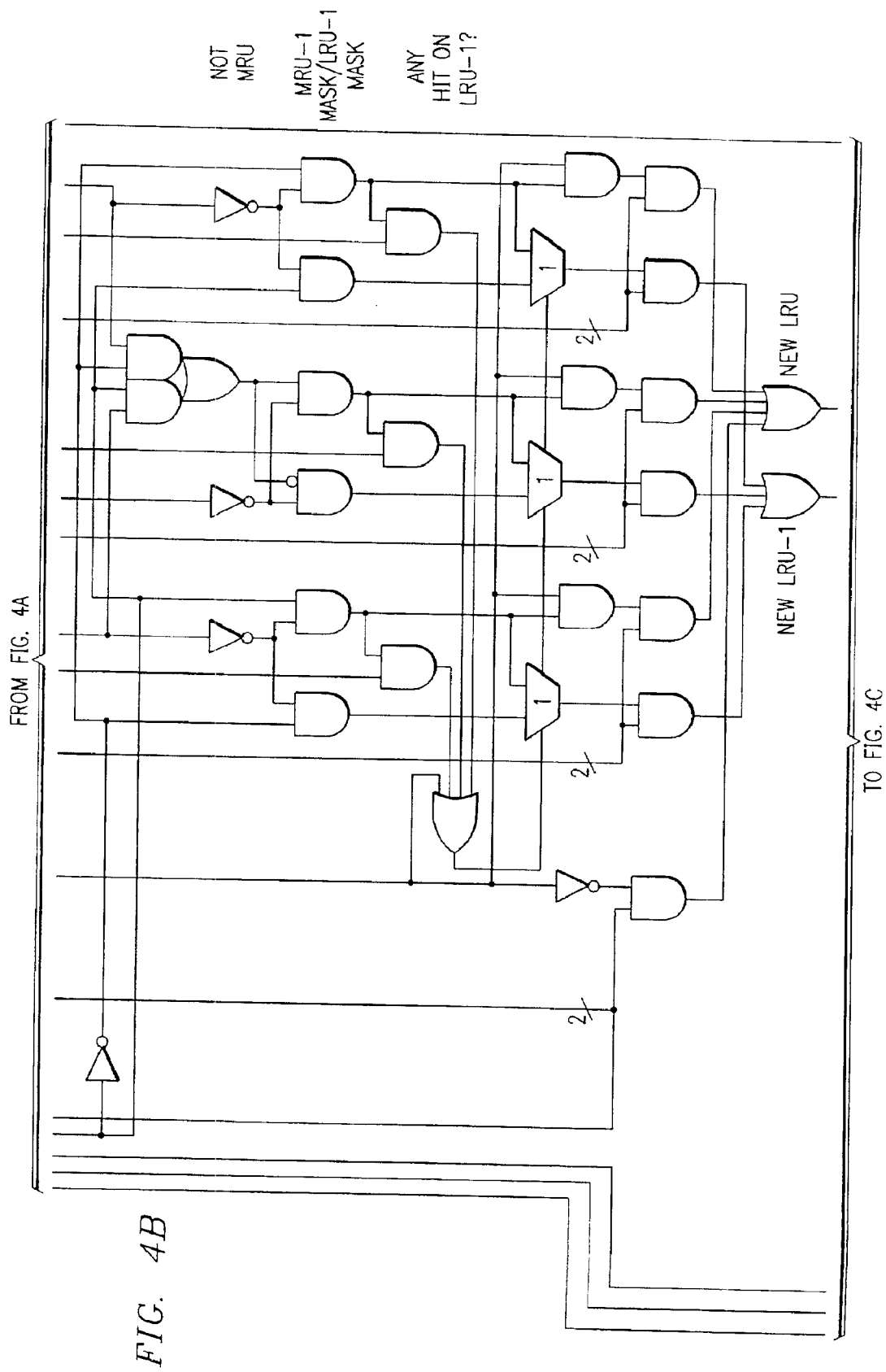
Figure 4C:
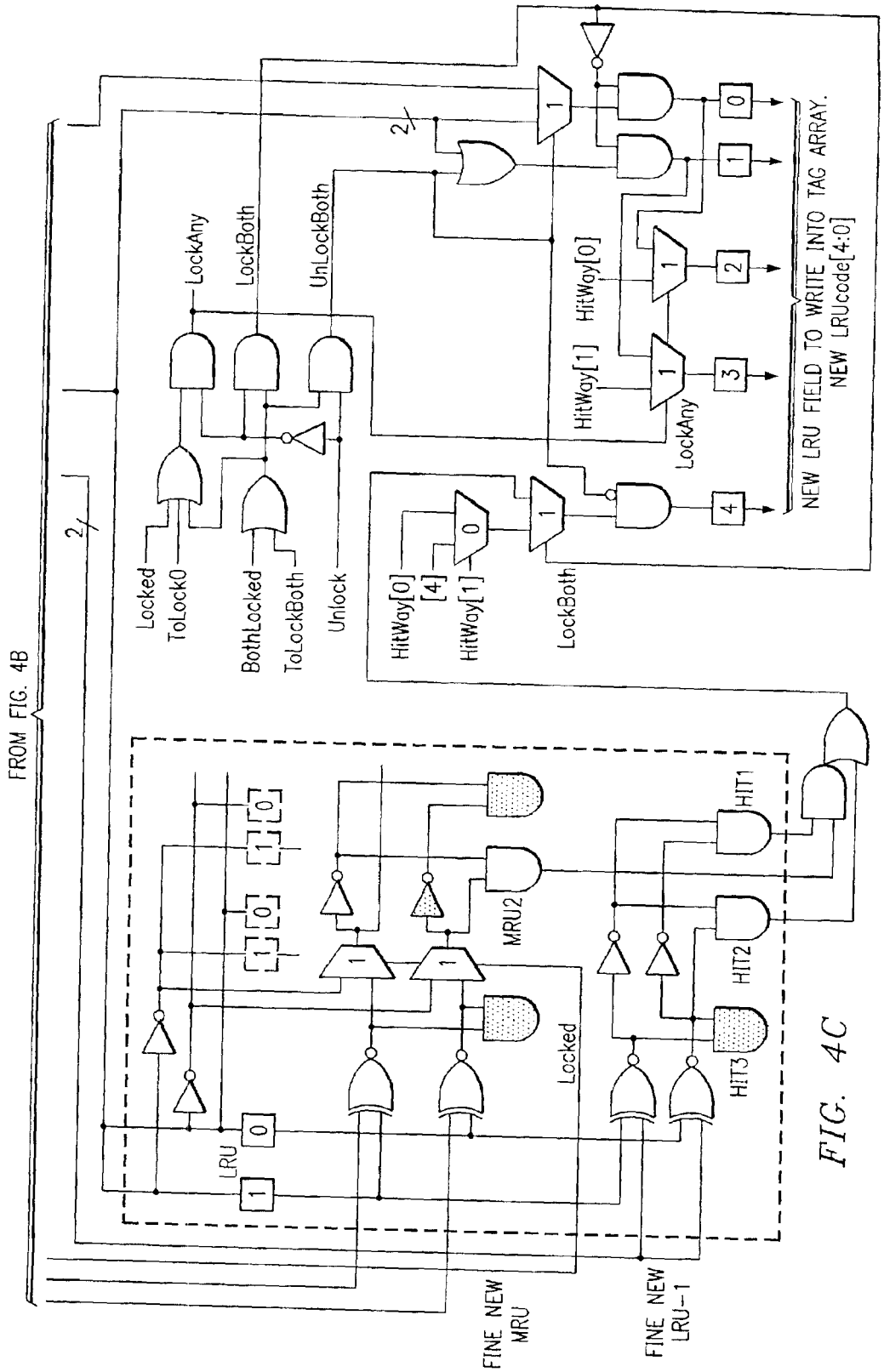

FIGS. 4A–C show an example simplified schematic for logic block 14. Logic block 14 uses bits b and a to generate the four unique gray code numbers using only two inverters. Bits d and c are compared with the four unique gray code numbers to generate a MRU mask. The MRU mask indicates a location for MRU way 22. Only one comparator is needed since ā (+) c=a (+) c̄=a(+)c. Hitway indicator 30 is compared to the four unique gray code numbers to generate a Hit mask. The Hit mask indicates a location of the Hit way. As before, since the four unique gray code numbers are generated using inverters, only one comparator is needed because ā (+)h=a (+) h̄=a(+)h. Once the MRU mask is known, the MRU-1 mask and the LRU-1 mask are generated. Using all of the masks, the new LRU way 22 and the new LRU-1 way 22 are obtained. The new LRU way 22 becomes bits b and a of new priority lock code 20a. The new LRU-1 way and Hitway indicator 30 are used to find the new MRU way 22 and the new MRU-1 way 22. The new LRU-1 way 22 and the new LRU way are used to find the new MRU-1 way 22. Hitway indicator 30 and the new LRU way 22 are used to find the new MRU way 22. Once the new MRU way 22 and the new MRU-1 way 22 are known, bit e of the new priority lock code 20a can be determined. These determinations are made in response to Setlock indicator 32 that provides an ability to lock one or more cache ways 22.

As shown above, the lock bits and the LRU bits can be combined into the same single decoded field. This reduces the number of bits required in a set and provides a cost saving mechanism. This reduction is possible in part because the priority code does not need to record usage for any locked cache way. The number of combinations is also reduced in order to shorten the width of the combined field.

Thus, it is apparent that there has been provided, in accordance with the present invention, a cache memory for identifying locked and least recently used storage locations that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, no statement in the specification is intended to limit in any way the patentable scope of the following claims.

What is claimed is:

1. A cache memory for identifying locked and least recently used storage locations, comprising:
   a plurality of data memory blocks, each data memory block having a plurality of storage locations, each data memory block having a particular storage location identified by an index value;
   a code memory block, the code memory block having a plurality of code values, a particular code value being associated with the index value, the particular code value operable to identify which ones of the particular storage locations associated with the index value are locked to prevent alteration of contents therein, the particular code value operable to identify which particular storage location has been most recently used and which particular storage location has been least recently used of the particular storage locations associated with the index value;
   wherein the code value is represented by five bits, the plurality of data memory blocks being a first data memory block, a second data memory block, a third data memory block, and a fourth data memory block.

2. The cache memory of claim 1, wherein a particular storage location associated with the index value in the first data memory block is locked when a first bit and a second bit of the code value are equal to a third bit and a fourth bit of the code value.

3. The cache memory of claim 2, wherein the particular storage locations associated with the index value of the first and second data memory blocks are locked when the first and second bits and the third and fourth bits of the code value have values of zero.

4. The cache memory of claim 3, wherein the code value identifies the particular storage location associated with the index value of the first data memory block as being most recently used.

5. The cache memory of claim 4, wherein the fifth bit of the code value identifies which particular storage location associated with the index value of the third and fourth data memory blocks as being least recently used.

6. The cache memory of claim 2, wherein the code value identifies the particular storage location of the first data memory block as being most recently used.

7. The cache memory of claim 2, wherein the first and second bits of the code value identifies which particular storage location of the second, third, and fourth data memory blocks has been least recently used.

8. The cache memory of claim 1, wherein none of the particular storage locations associated with the index value in the first, second, third, and fourth data memory blocks are locked when a first bit and a second bit of the code value are different than a third bit and a fourth bit of the code value.

9. The cache memory of claim 8, wherein the first and second bits of the code value identify which particular storage location associated with the index value in the first, second, third, and fourth data memory blocks has been least recently used.

10. The cache memory of claim 8, wherein the third and fourth bits of the code value identify which particular storage location associated with the index value in the first, second, third, and fourth data memory blocks has been most recently used.

11. The cache memory of claim 8, wherein the fifth bit of the code value identifies which particular storage location associated with the index value in the first, second, third, and fourth data memory blocks has been second most recently used and second least recently used.

12. The cache memory of claim 1, further comprising:
a logic circuit operable to determine the code value.

13. The cache memory of claim 12, wherein the logic circuit is operable to receive a hit signal identifying which particular storage location associated with the index value has been most recently accessed, the logic circuit operable to adjust the code value in response to the hit signal.

14. The cache memory of claim 12, wherein the logic circuit is operable to output an indication of which particular storage location associated with the index value has been least recently used.

15. A method for identifying locked and least recently used storage locations in a cache memory, comprising:
   determining an access order of a plurality of data memory blocks associated with an index from least recently used to most recently used;
   determining which of the plurality of data memory blocks is to be locked and prevented from having its contents replaced;
   encoding into a single code value an identity of a most recently used data memory block, a least recently used data memory block, and any locked data memory blocks;
   associating the single code value with the index;
   wherein the third and fourth bits of the single code value are not equal to the first and second bits of the single code value in response to none of the data memory blocks being locked.

16. A method for identifying locked and least recently used storage locations in a cache memory, comprising:
   determining an access order of a plurality of data memory blocks associated with an index from least recently used to most recently used;
   determining which of the plurality of data memory blocks is to be locked and prevented from having its contents replaced;
   encoding into a single code value an identity of a most recently used data memory block, a least recently used data memory block, and any locked data memory blocks;
   associating the single code value with the index;
   wherein at least one of the data memory blocks is locked in response to the third and fourth bits of the single code value being equal to the first and second bits of the single code value.

17. The method of claim 16, wherein the first and second bits of the single code value identify the data memory block as being least recently used.

* * * * *